United States Patent
Chu et al.

(10) Patent No.: US 9,682,540 B2
(45) Date of Patent: Jun. 20, 2017

(54) METHOD FOR MAKING MULTI-LAYER PRINT MEDIA BY EXTRUSION COATING

(75) Inventors: Chia-Hsi Chu, Arcadia, CA (US); Eugene Rozenbaoum, Arcadia, CA (US); Frank Y. Shih, Arcadia, CA (US); Stephen Li, Huntington Beach, CA (US); Prakash Mallya, Sierra Madre, CA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 12/712,759

(22) Filed: Feb. 25, 2010

(65) Prior Publication Data

US 2010/0215880 A1 Aug. 26, 2010

Related U.S. Application Data

(60) Provisional application No. 61/155,199, filed on Feb. 25, 2009.

(51) Int. Cl.
*B44C 1/17* (2006.01)
*B29C 47/06* (2006.01)
(Continued)

(52) U.S. Cl.
CPC .......... *B32B 37/025* (2013.01); *B32B 37/153* (2013.01); *B32B 37/12* (2013.01); *B32B 38/0008* (2013.01); *B32B 2307/406* (2013.01); *B32B 2307/718* (2013.01); *B32B 2309/105* (2013.01); *B32B 2310/0481* (2013.01); *B32B 2310/14* (2013.01); *B32B 2323/10* (2013.01); *B32B 2367/00* (2013.01); *B32B 2553/00* (2013.01); *Y10T 428/14* (2015.01); *Y10T 428/31855* (2015.04)

(58) Field of Classification Search
USPC .......... 428/40.1, 500; 156/244.11, 230, 231, 156/247
IPC ....................... B32B 27/32,37/15; B29C 47/06
See application file for complete search history.

(56) References Cited

U.S. PATENT DOCUMENTS

| | | | |
|---|---|---|---|
| 4,317,860 A | 3/1982 | Strassel | |
| 4,364,886 A | 12/1982 | Strassel | |

(Continued)

FOREIGN PATENT DOCUMENTS

| | | |
|---|---|---|
| CN | 1433359 | 7/2003 |
| EP | 0464921 | 6/1991 |

(Continued)

OTHER PUBLICATIONS

Invitation to Pay Additional Fees dated Jul. 9, 2010 issued in corresponding International application No. PCT/US2010/025370.
(Continued)

*Primary Examiner* — Sing P Chan
(74) *Attorney, Agent, or Firm* — Avery Dennison Corporation

(57) ABSTRACT

The current invention utilizes an extrusion coating method as a key step in a series of multilayer construction processes to make a laminate for graphic application. The extrusion coated layer performs as a strengthening layer to provide mechanical properties for the construction, while an ink receptive coating layer delivers high quality printability performance. High gloss can be achieved through the use of a PET carrier.

20 Claims, 3 Drawing Sheets

(51) Int. Cl.

| | | |
|---|---|---|
| *B29C 47/34* | (2006.01) | |
| *B29C 65/52* | (2006.01) | |
| *B32B 37/26* | (2006.01) | |
| *B32B 38/10* | (2006.01) | |
| *B32B 37/00* | (2006.01) | |
| *B32B 37/15* | (2006.01) | |
| *B32B 37/12* | (2006.01) | |
| *B32B 38/00* | (2006.01) | |

(56) References Cited

U.S. PATENT DOCUMENTS

| | | | | |
|---|---|---|---|---|
| 4,446,274 | A | * | 5/1984 | Okazaki et al. ............ 524/812 |
| 4,810,540 | A | | 3/1989 | Ellison et al. |
| 4,902,557 | A | * | 2/1990 | Rohrbacher .................. 428/215 |
| 5,202,162 | A | * | 4/1993 | Hart et al. .................... 427/282 |
| 5,281,290 | A | * | 1/1994 | Bosler ........................... 156/230 |
| 5,527,578 | A | * | 6/1996 | Mazurek ............ C08F 290/068 |
| | | | | 427/387 |
| 5,647,935 | A | | 7/1997 | Hoshino et al. |
| 5,804,300 | A | * | 9/1998 | Maro et al. ................... 428/335 |
| 6,132,822 | A | * | 10/2000 | Overcash ............... D21H 19/16 |
| | | | | 428/195.1 |
| 6,299,303 | B1 | * | 10/2001 | Wexler .......................... 347/105 |
| 6,403,005 | B1 | * | 6/2002 | Mientus et al. ............. 264/173.1 |
| 6,623,841 | B1 | | 9/2003 | Venkatasanthanam et al. |
| 6,800,341 | B2 | | 10/2004 | Emslander et al. |
| 6,857,737 | B2 | * | 2/2005 | Emslander et al. .......... 347/105 |
| 8,003,176 | B2 | * | 8/2011 | Ylitalo et al. ............. 428/32.13 |
| 2002/0088154 | A1 | | 7/2002 | Sandt et al. |
| 2002/0164464 | A1 | * | 11/2002 | Monie ........................... 428/195 |
| 2003/0219674 | A1 | * | 11/2003 | Bhave et al. ................. 430/200 |
| 2005/0074573 | A1 | * | 4/2005 | Bowen ............... B29C 37/0075 |
| | | | | 428/40.1 |
| 2010/0009108 | A1 | | 1/2010 | Shih | |

FOREIGN PATENT DOCUMENTS

| | | |
|---|---|---|
| EP | 2119562 | 11/2009 |
| JP | 61-270198 | 11/1986 |
| JP | 1996-207426 | 8/1996 |
| JP | 1996-244399 | 9/1996 |
| JP | 1997-277458 | 10/1997 |
| JP | 1998-293510 | 11/1998 |
| JP | 1998-333512 | 12/1998 |
| JP | 1999-249511 | 9/1999 |
| JP | 2000-108273 | 4/2000 |
| JP | 2000-515442 | 11/2000 |
| JP | 2003-091090 | 3/2003 |
| JP | 2003-131533 | 5/2003 |
| JP | 2004-050596 | 2/2004 |
| JP | 2005-288876 | 10/2005 |
| JP | 2006-010837 | 1/2006 |
| JP | 2009-029127 | 2/2009 |
| WO | 99/59029 | 11/1999 |
| WO | 00/01536 | 1/2000 |
| WO | 00/13887 | 3/2000 |
| WO | 02/055295 | 7/2002 |
| WO | 2004/091908 | 10/2004 |
| WO | 2007/123399 | 11/2007 |

OTHER PUBLICATIONS

International Search Report and Written Opinion dated Sep. 20, 2010 issued in corresponding International application No. PCT/US2010/025370.

International Preliminary Report of Patentability dated Aug. 30, 2011 issued in corresponding International Application No. PCT/US2010/025370.

* cited by examiner

METHOD FOR MAKING MULTI-LAYER PRINT MEDIA BY EXTRUSION COATING

CROSS-REFERENCE TO RELATED APPLICATION

The present application claims the benefit of U.S. Provisional Patent Application No. 61/155,199 filed Feb. 25, 2009, which is incorporated herein by reference in its entirety.

FIELD OF THE INVENTION

The current invention utilizes an extrusion coating method as a key step in a series of multilayer construction processes to make a laminate for graphic application. The extrusion coated layer performs as a strengthening layer to provide mechanical properties for the construction, while an ink receptive coating layer delivers high quality printability performance. High gloss can be achieved through the use of a PET carrier.

BACKGROUND OF THE INVENTION

Vinyl films plasticized with plasticizers have been used for many years in adhesive labels, tapes and decorative sheets. Vinyl films, particularly polyvinyl chloride (PVC) films, have had wide acceptance for such applications because, among other things, they are inexpensive and weather resistant and can be colored easily with pigments and dyes. In addition, plasticized polyvinyl chloride (PVC) has had particularly wide acceptance because its properties can be modified over a wide range by the incorporation of plasticizers. These films have been used in various graphic applications with success.

Although vinyl films have been useful in graphic and wall covering applications because of their superior flexibility and conformability, there is a continuing need to develop films which do not contain PVC. Halogen-containing materials, such as PVC, have generally been recognized as producing undesirable, environmentally unfriendly, by-products when burned.

Accordingly, there is a need for environmentally friendly, non-halogen containing, and in particular, non-PVC containing films that have properties that are comparable to films containing halogens. In some cases, PVC based vinyl materials are being replaced by polyolefins due to the relatively lower cost, many choices of available materials, and the flexibility of polyolefins. A key problem with polyolefin based material is its poor print quality. In replacing vinyl film with polyolefin films, attempts have been made to have a multilayer coextruded film using ink receptive skin layers. However, the print quality of these coextruded films is not good for inkjet printers.

A number of graphics applications, such as wrapping of vehicles including busses, trailers and the like, require the use of a conformable film such that a graphics installer can easily apply such a film to a non-smooth surface. To produce a PVC-free film material with good printability, one will typically use a polyolefin material such as a polypropylene or polyester substrate with a printable top coat. Polypropylene and polyester however are not considered to be "conformable" material and do not perform well on non-smooth surfaces. Further, more conformable base materials, such as polyethylene and ethylene vinyl acetate (EVA), are difficult to use in graphics applications due to lower modulus of the film especially under top-coat drying conditions.

Moreover, there is a need in graphics industry to print on media with superior gloss level. Although coextruded film can achieve a glossy surface by casting onto a polished roller, it is in general a difficult balance to select an extruded skin material with good ink adhesion property which is not tacky.

It is also, highly desirable, to have a graphics film with good dimensional stability throughout the life cycle of its use. Graphics films which tend to shrink over time will cause the adhesive edges of the film to become exposed after application. Traditionally, cast vinyl film has lower shrinkage versus calendared vinyl. Lower stress in the cast process results in a lower shrinkage and thus a more dimensionally stable film.

Many different approaches have been taken in recent years for producing decorative graphics films. These processes are generally categorized by solution casting techniques or extrusion techniques. For instance, U.S. Pat. No. 4,810,540 to Ellison et al. and U.S. Pat. No. 4,902,557 to Rohrbacher use solution casting techniques in which liquid-cast, solvent-based clear coats and pigmented base coats are applied to a flexible casting sheet by a coating process such as reverse roll coating or gravure printing. The liquid cast layers are separately applied and then dried at high temperatures to evaporate the solvents.

U.S. Pat. Nos. 4,317,860 and 4,364,886 to Strassel also disclose coextrusion of multi-layer films such as a two-layer coextrusion of predominantly PVDF on one side and a predominantly acrylic resin on the other side of the coextruded sheet. These unitary structures are used to make molded articles, or to adhere the sheets to a molded polymer.

Film extrusion techniques also have been used in the past for making free films in which the extruded polymeric material is coated on a polished drum. These films are then undercoated with various color coats. The exterior surface of the extruded free film that contacts the drum (and is separated from the drum as a free film) does not have a high gloss and high distinctness-of-image. Also films manufactured in this manner do not have a carrier sheet attached, which makes them hard to handle and easily damaged in subsequent processing.

The present invention, utilizes a series of process steps, to create a polyolefin based graphic film face-stock which possesses superior print quality, high gloss, and low stress buildup and good dimensional stability to satisfy the needs of the graphics industry.

SUMMARY OF THE INVENTION

One embodiment of the current invention utilizes an extrusion coating method as a key step in a series of multilayer construction processes to make graphics film face which can be used in a laminate for graphic application. The extrusion coated layer performs as a strengthening layer to provide mechanical properties for the graphics film face construction, while an ink receptive coating layer delivers high quality printability performance. High gloss of the ink receptive layer can be achieved through the use of a PET carrier.

A second embodiment of the current invention is a process for making a graphic film which includes, a) coating and drying an ink receptive layer onto a carrier web, d) extrusion coating a polyolefin material onto the ink receptive layer of step (a), and c) removing the carrier web from the ink receptive layer to expose a surface of the ink receptive layer wherein the surface may be glossy.

Another embodiment of the current invention is a process as described above, wherein the carrier web is a polyester film, such as PET.

Another embodiment of the current invention is a process as described in the second embodiment of the invention, wherein the ink receptive layer can be a vinyl acetate homopolymer or copolymer or the mixture of, an acrylic copolymer or its mixture with a vinyl acetate/ethylene copolymer, a vinyl acetate/ethylene copolymer and acrylic hybrid, or a polyurethane containing polymer.

Another embodiment of the current invention is a process as described in the second embodiment of the invention, wherein an optional treatment step of the dried ink receptive layer includes but is not limited to, coating of an adhesion promoting layer, corona treatment, flame treatment, plasma treatment, ozone treatment or a combination of the above.

Another embodiment of the current invention is a process as described in the second embodiment of the invention, where the polyolefin materials can be polyethylene, polypropylene, ethylene vinyl acetate copolymer, ethylene copolymers with hexene, butene, or octene, polypropylene copolymers, poly-methyl-pentene, cyclic olefin polymer, cyclic olefin copolymers, metallocene catalyst based polyolefins, thermoplastics and elastomers.

Another embodiment of the current invention is a process as described in the second embodiment of the invention, wherein the ink receptive coating layer thickness is less than 60 micron.

Another embodiment of the current invention is a process as described in the second embodiment of the invention, wherein the extrusion coated layer thickness is between 20 micron and 100 micron.

Another embodiment of the current invention is a laminate for graphics film, comprising a) a graphics film face material made by the process as described hereinbefore comprising an ink receptive surface and a polyolefin surface, b) an adhesive layer on the polyolefin surface, and c) a liner adhered to the adhesive layer.

These, as well as other features, aspects, and advantages of this invention, will be more completely understood and appreciated by referring to the following more detailed description of the presently preferred exemplary embodiments of the invention in conjunction with the accompanying drawings, of which:

DETAILED DESCRIPTION OF THE EMBODIMENTS

Figure 1:
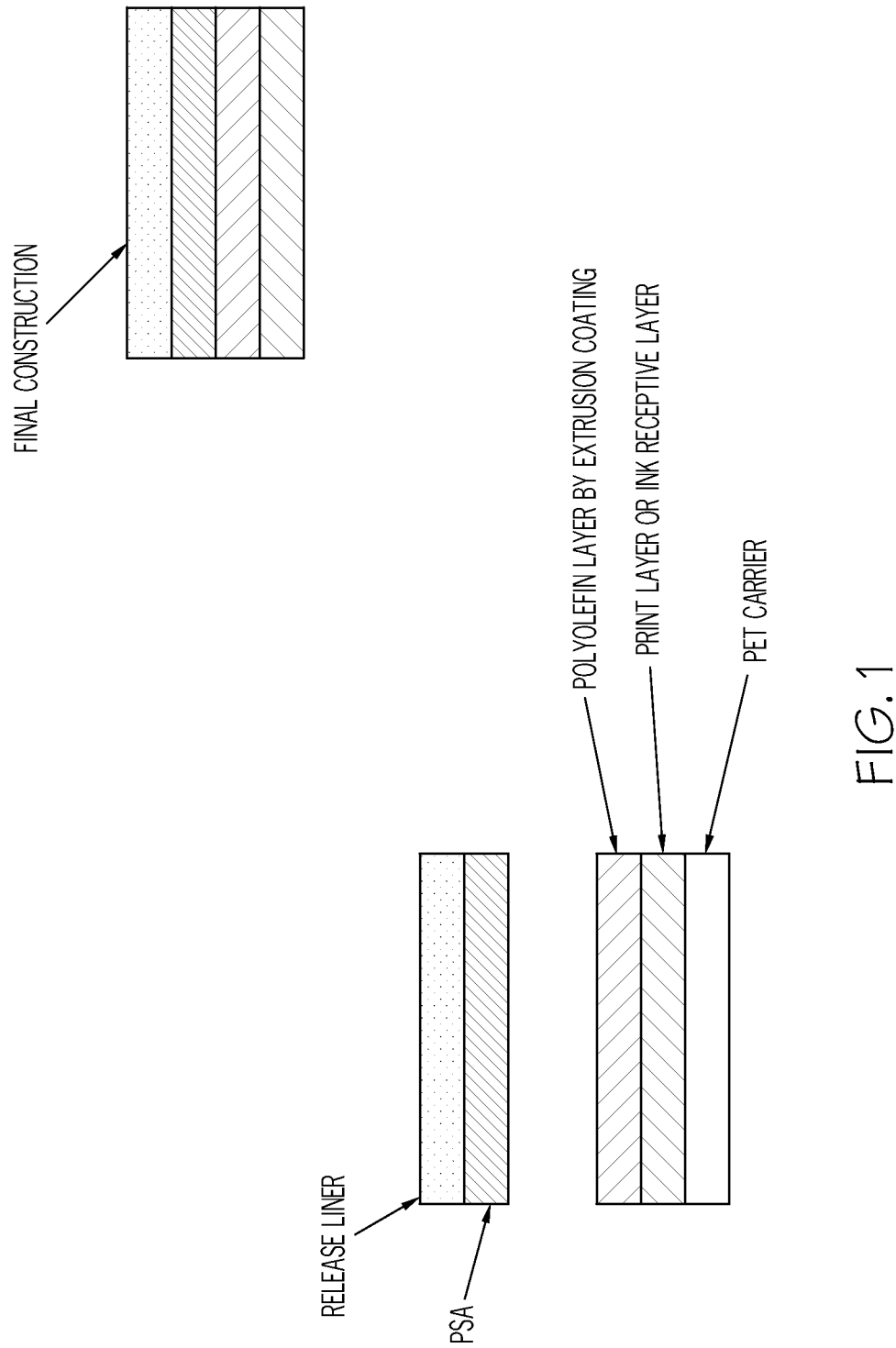
FIG. 1 is a sectional view of a film prepared in accordance with an exemplary embodiment of the present invention.

The present invention is now illustrated in greater detail by way of the following detailed description that represents the best presently known mode of carrying out the invention. However, it should be understood that this description is not to be used to limit the present invention, but rather, is provided for the purpose of illustrating the general features of the invention.

According to the present invention, a carrier web is first coated with an ink receptive layer and dried to produce a substrate.

The ink receptive print layer can be made of any formulations that yield an ink receptive layer. For example, the ink receptive layer can be selected from a vinyl acetate homopolymer or copolymer or a mixture thereof, an acrylic copolymer or a mixture of an acrylic copolymer with a vinyl acetate/ethylene copolymer, a vinyl acetate/ethylene copolymer and an acrylic hybrid, or a polyurethane containing polymer. Other embodiments of ink receptive print layers have been described in detail in U.S. application Ser. No. 12/323,788, which is incorporated herein by reference in its entirety. The ink receptive print layer is created by die coating onto a carrier film (web). In one embodiment, where an ink receptive layer having a relatively high gloss surface is desired, a PET carrier is used as the carrier web due to PET having low surface roughness which results in a highly glossy surface on the ink receptive layer after removal of the carrier later in the process. Other carriers can be used including, but not limited to, those described in U.S. application Ser. No. 12/323,788. The gloss level of the as coated ink receptive layer surface can reach at least 70 gloss units measured at 60° angle with a Triglossmeter made by BYK Gardner. It is more desirable, of course, to have a surface with higher than 80 gloss units, and most desirable higher than 90. The coating methods can be, for example, either a die coating or a gravure coating with various coating methods available to person skilled in the art. On the other hand, for applications where matte film is desired, the ink receptive print layer can be coated onto a carrier film with relatively higher surface roughness.

The thickness of the ink receptive layer can vary in accordance with the formulation of the ink receptive layer. In general, the ink receptive layer should be limited to being as thin as practicable to achieve good ink receptivity. In accordance with one embodiment of the invention, the ink receptive layer is less than 60 microns in thickness.

The single ink receptive coating layer, is typically not used as a stand-alone film for graphic application. It is therefore highly desirable to add a strengthening layer to the non-PET side of the ink receptive layer. By combining a coated ink receptive layer with an extrusion coated polyolefin layer, advantages can be obtained due to the various physical properties of the polyolefin to achieve a variety of requirements demanded by graphic applications. As examples, cast vinyl film is known for its superior conformability, while polyolefin materials desired such as low density polyethylene, can be extrusion coated to desired thickness to have the conformability. For less conformable replacement material, such as, for example, calendared vinyl, extrusion coating of polypropylene material can be more applicable.

Figure 3:
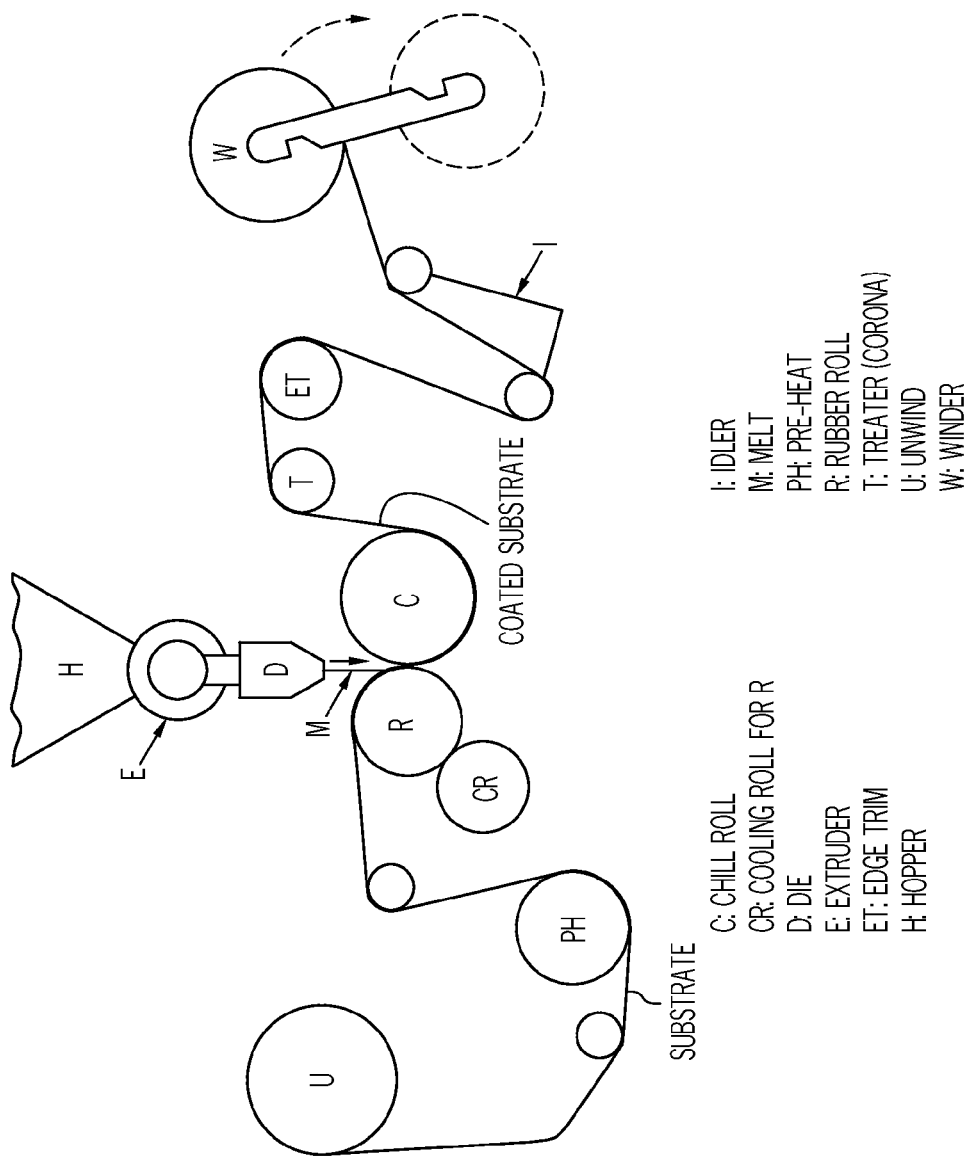
FIG. 3 is a diagram of a typical extrusion coating process.

To extrusion coat a substrate, a process as shown in FIG. 3 can be utilized. In this case a carrier web which is coated with an ink receptive layer is extrusion coated with polyolefin. The polyolefin resin is initially melted, for example, by heat and pressure inside an extruder barrel. It is then forced by the screw of the extruder to flow through a narrow slit of an extrusion coating die. Here the polyolefin material is defined as polyethylene, polypropylene, their copolymers, ethylene vinyl acetate or other ethylene based copolymers such as ethylene methacrylic acid, ethylene acrylic acid, ethylene octane, ethylene hexane, and ethylene butane copolymers and the like. More specifically, the polyolefins are selected from one or more of polyethylene, polypropylene, ethylene vinyl acetate copolymer, ethylene copolymers with hexene, butene, or octene, polypropylene copolymers, poly-methyl-pentene, cyclic olefin polymer, cyclic olefin copolymers, metallocene catalyst based polyolefins, thermoplastics and elastomers. In a further embodiment, two closely related copolymers made of ethylene and vinyl acetate: the ethylene vinyl acetate (EVA) copolymers in which the vinyl acetate content generally ranges in composition from about 10-40%, up to about 50%, and vinyl acetate ethylene (VAE) copolymers where the vinyl acetate content varies between about 60-90% of the formulation, can be used as the polyolefin in accordance with the invention. EVAs are solid materials, whereas VAEs are mostly water-based emulsions.

The molten film is drawn down to a nip between two rolls underneath the die. The two rolls are typically a driven chill roll and a rubber covered pressure roll. As the melt comes into contact with the moving substrate, film with desired thickness can be formed onto the substrate. The film can be coated at a speed up to 1000 ft/min.

An optional step of treatment or priming of the substrate, comprising the carrier and the ink receptive layer coated thereon, before extrusion coating of the polyolefin is desirable in certain cases to achieve good interlayer adhesion. Treatment methods include, but are not limited to, coating of an adhesion promoting layer, corona treatment, flame treatment, plasma treatment, ozone treatment or a combination of the above. For example, a corona treatment of the substrate to above 40 dynes is one way to achieve this treatment. Optionally, after treatment, an adhesion primer, such as polyethyleneimine dispersion can be in-line coated onto the corona treated ink receptive layer and dried before extrusion coating.

Further, to achieve good adhesion, extruder temperatures as high as 650° F. are commonly used. The process is therefore different from cast film process where the processing temperature is much lower. In order to achieve such high temperature, an extruder should preferably have a barrel length to diameter ratio of at least 20:1 up to as high as 28:1. A longer barrel allows better mixing which helps in generating internal heat. The longer barrel also allows for an additional number of electric heaters to be installed to an extruder barrel.

Extrusion coating dies are generally wider than the width of the substrate to be coated, as the width of the extruded material narrows before touching the substrate. It is common to run extrusion coating on substrate which is much narrower than the die width. This is done by adjustable deckles inserted to the ends or clamped to the bottom face of the die.

In one embodiment of the current invention, the polyolefin is extrusion coated onto an ink receptive print layer that has been treated as described hereinbefore. The thickness of the extrusion coated layer can be a few microns to hundreds of microns, which is determined by the physical property desired for the final construction. In one embodiment, the thickness of the extrusion coated polyolefin can be, for example, between 20 micron and 100 micron.

The graphics film face prepared in accordance with the process of the invention can be used in the construction of a graphics film laminate construction as shown in FIG. 1. The graphics film laminate construction can comprise, for example, a graphics film face material made by the process as described hereinbefore comprising an ink receptive surface which may be glossy, and a polyolefin surface, an adhesive layer on the polyolefin surface, and a liner adhered to the adhesive layer. The adhesives can be applied, for example, by adhesive lamination. Adhesives can include pressure sensitive adhesives. Preferably the adhesives are selected from halogen free adhesives to produce halogen-free films. Examples of halogen-free adhesives include acrylic adhesives such as a hot-melt acrylic adhesive and a water-based latex acrylic adhesive. Other halogen-free adhesives include a hot-melt rubber adhesive, a silicone adhesive, thermoplastic elastomers, other halogen-free adhesives known in the art, and any combination of any of these in any proportion.

To improve subsequent lamination to adhesives, corona treatment of the extrusion coated polyolefin layer can be done, for example, either in-line with the extrusion coating process or off-line before adhesive lamination. In certain situations, it is also desirable to co-extrusion coat multiple layers with at least one layer for improved adhesion. This adhesion promoting layer can be a thin layer (less than 1 um) to further improve adhesion between the print layer and the strengthening layer, or the adhesion between the strengthening layer and the pressure sensitive adhesive layer.

Figure 2:
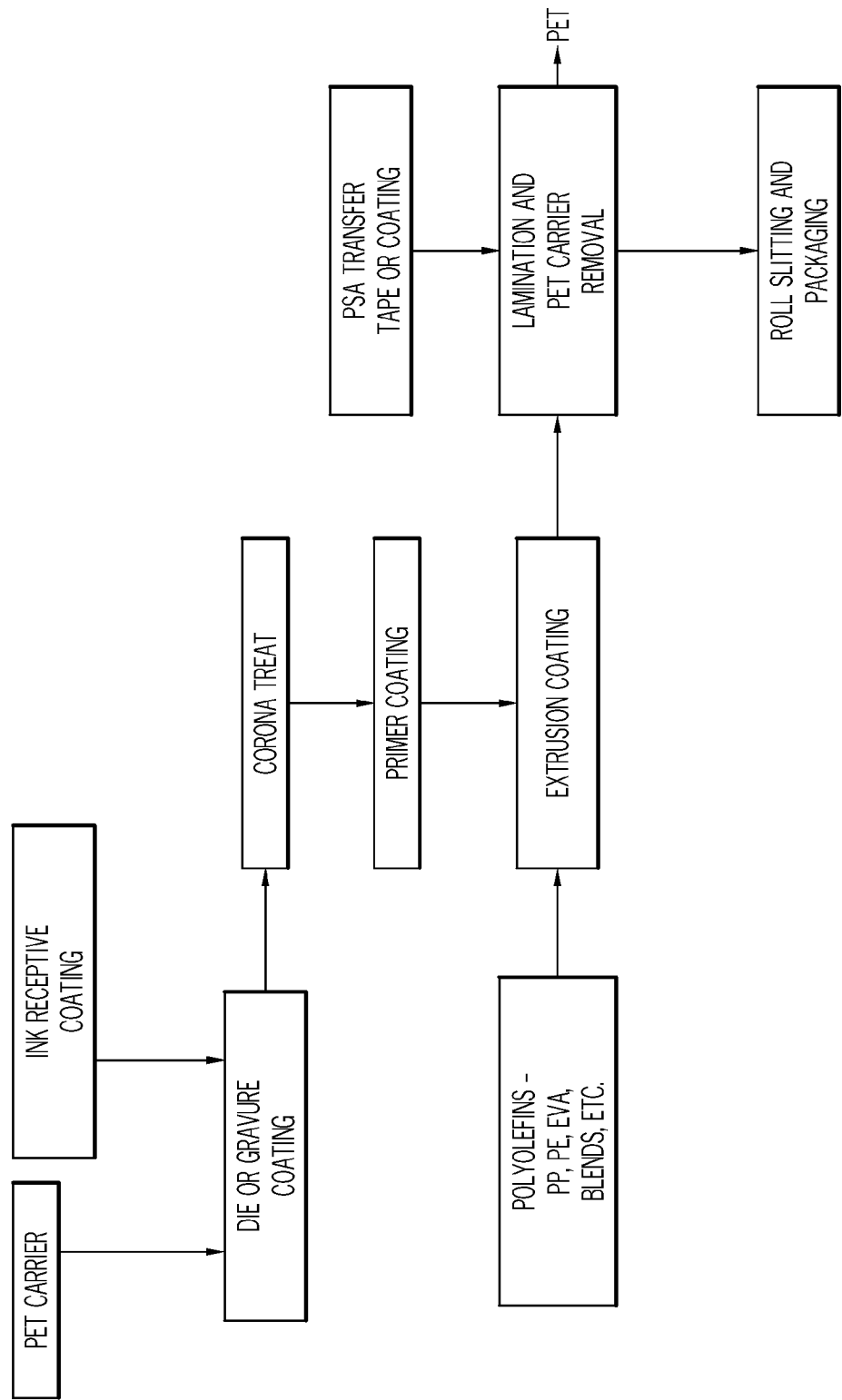
FIG. 2 is a flow diagram of a method of making a film in accordance with the present invention.

An exemplary process of the invention is shown in FIG. 2 of the drawings.

The following examples describe the various embodiments of the present invention. Numerous modifications and variations within the scope of the present invention will be apparent to those skilled in the art and the present invention is not limited to the examples given below. Unless otherwise states, all parts, percentages, and ratios reported in the following examples are on a weight basis, and all reagents used in the examples were obtained, or are available, from the chemical supplier identified below, or can be synthesized by conventional techniques.

Test Methods

The physical properties of the samples were tested using mechanical properties measurement techniques, e.g., Instron. A modified ASTM D882 was used to determine the tensile strength and percentage elongation of the films of the present invention. The procedure is as follows:

1. A 1"×4" specimen was cut out in the machine direction or the cross machine direction.
2. Grip the film 1" from the end at both the ends, so the separation between the grips is 2 inches.
3. Set the crosshead speed at 12 inches per minute ("ipm").
4. The % elongation is reported by the machine.

Extrusion Coating Example 1

A sheet of coated ink receptive coating (IRC), made of acrylic with TiO2, 1.4 mil coated on 1.4 mil PET (PET/IRC) was corona treated on the IRC side first to ensure a surface energy of above 50 dynes/cm. After corona treatment, the sheet was primer coated using a gravure cylinder. An aqueous primer, made of polyethyleneimine dispersion (Mica Corporation), in water at a solid content of equal to or less than 2.5% was used. The coat weight of the primer is less than 0.1 g/m².

EVA copolymer resin (Ateva AT 1651 from AT Plastics with 16% VA content) was extrusion coated on top of the primer. The extrusion temperature was typically at 420° F. to have low viscosity melts and to prevent any gel formation of the EVA resin. After extrusion coating, the PET carrier was removed to expose the glossy surface. A sample (IRC/primer/EVA) was made and characterized in the attached table and compared to the commercial Avery cast vinyl film.

TABLE 1

| Sample ID | Thickness (mil) | Young's Modulus (Mpa) | Tensile (lb/in) at yield | Tensile (lb/in) at break | Break/Yield | % Elongation at yield | % Elongation at break |
|---|---|---|---|---|---|---|---|
| IRC/Primer/EVA | 2.22 | 267 | 2.6 | 3.9 | 1.5 | 5 | 293 |
| Avery A9 Cast Vinyl | 2.0 | 763 | 6.5 | 6.7 | 1.0 | 20 | 181 |
| Avery MPI 1005 | 2.0 | 413 | 5.8 | 8.2 | 1.4 | 20 | 284 |

Extusion Coating Example 2

As in prior example 1, the same sheet of coated ink receptive coating was corona treated and primer coated. A low density polyethylene resin (Westlake Polymer E6838-850P, density 0.915 g/cm$^3$, melt index 12.5 g/10 min at 190° C./2.16 kg) was extrusion coated to the ink receptive coating (IRC) side of the base sheet at a temperature about 600° F. The film sample (IRC/primer/LDPE) was made and characterized in the attached table. A comparison was made with an Avery Graphics calendared vinyl film MPI 2000 for comparison.

TABLE 2

| Sample ID | Thickness (mil) | Young's Modulus (Mpa) | Tensile (lb/in) at yield | Tensile (lb/in) at break | Break/Yield | % Elongation at yield | % Elongation At break |
|---|---|---|---|---|---|---|---|
| IRC/Primer/LDPE | 3.38 | 202 | 3.9 | 4.6 | 1.2 | 6 | 201 |
| MPI2000 MD | 3.20 | 651 | 9.1 | 13.4 | 1.5 | 6 | 341 |
| MPI2000 CD | 3.20 | 593 | 8.6 | 14.4 | 1.7 | 7 | 440 |

Example 3

This example is to further develop the extrusion coating material to match more closely with the calendared vinyl films, such as Avery MPI 2000. Film samples with TiO2 were made to test for mechanical properties and opacity.
Materials:
a: PP DS6D81 (random copolymer, Dow Chemicals)
b: E6838-850P (LDPE, Westlake Polymers)
c: Ateva 1651 (EVA copolymer, AT Plastics)
d: Pro-fax PH835 (homo-polypropylene, LyondellBasell)
e: P9H8M-015 (polypropylene, Flint Hills Resources)

All blends in the following examples contain 15 parts of TiO2 compound Polybatch White P8555SD (A. Schulman)

Examples 3-1

Effect of LDPE on mechanical properties of film made of co-PP/LDPE blends

TABLE 3

| ID | Material - Composition | | | Young's Mod, MPa | SD | Tensile @ yield, psi | SD | Tensile @ break, psi | SD | Strain @ yield, % | SD | Strain @ break, % | SD | Thickness, in |
|---|---|---|---|---|---|---|---|---|---|---|---|---|---|---|
| 011209-01 | a-100 | b-0 | MD | 277 | 6 | 2164 | 79 | 4715 | 882 | 16.4 | 1.6 | 697 | 93 | 0.0025 |
| | | | CD | 276 | 12 | 2122 | 57 | 4716 | 252 | 18.3 | 0.7 | 880 | 29 | 0.0025 |
| 011209-02 | a-80 | b-20 | MD | 317 | 35 | 2357 | 36 | 4500 | 143 | 15.0 | 0.2 | 780 | 27 | 0.0028 |
| | | | CD | 307 | 31 | 2219 | 193 | 3505 | 675 | 17.4 | 1.2 | 825 | 99 | 0.0031 |
| 011209-03 | a-60 | b-40 | MD | 245 | 4 | 2007 | 70 | 3803 | 352 | 20.0 | 2.6 | 768 | 73 | 0.0028 |
| | | | CD | 228 | 14 | 1828 | 34 | 2345 | 552 | 15.7 | 2.1 | 682 | 83 | 0.0029 |
| 011309-01 | A-40 | b-60 | MD | 208 | 11 | 1742 | 32 | 3710 | 161 | 16.3 | 0.6 | 820 | 34 | 0.0031 |
| | | | CD | 189 | 6 | 1548 | 31 | 1610 | 341 | 16.7 | 2.1 | 425 | 76 | 0.0032 |
| 011309-02 | a-20 | b-80 | MD | 191 | 5 | 3498 | 456 | 2395 | 418 | 18.0 | 1.7 | 560 | 129 | 0.0026 |
| | | | CD | 150 | 3 | 1273 | 36 | 727 | 109 | 18.0 | 1.5 | 206 | 109 | 0.0028 |
| 011309-03 | a-0 | b-100 | MD | | | 1286 | 36 | 1321 | 393 | 18.3 | 1.2 | 400 | 65 | 0.0028 |

SD-Standard Deviation

Addition of LDPE reduces Young's modulus and tensile strength.

Examples 3-2

Comparison of Mechanical Properties of EVA and PP Based Films

TABLE 4

| ID | Composition | | Young's Mod, MPa | SD | Tensile @ yield, psi | SD | Tensile @ break, psi | SD | Strain @ yield, % | SD | Strain @ break, % | SD | Thickness, in |
|---|---|---|---|---|---|---|---|---|---|---|---|---|---|
| 011309-06 | c-100 | MD | 55 | 2 | 1124 | 55 | 1661 | 148 | 61.2 | 8.0 | | | 0.0029 |
| 011409-01 | d-100 | MD | 545 | 70 | 2558 | 230 | 3403 | 797 | 13.7 | 1.6 | 692 | 82 | 0.0031 |

PP based film is much stiffer and stronger.

Examples 3-3

Comparison of co-PP and LDPE as Additives to PP

TABLE 5

| ID | Composition | | | Young's Mod, MPa | SD | Tensile @ yield, psi | SD | Tensile @ break, psi | SD | Strain @ yield, % | SD | Strain @ break, % | SD | Thickness, in |
|---|---|---|---|---|---|---|---|---|---|---|---|---|---|---|
| 012209-01 | e-100 | | MD | 523 | 44 | 2813 | 103 | 4101 | 280 | 16.4 | 0.9 | 796 | 48 | 0.0028 |
| | | | CD | 478 | 27 | 2546 | 42 | 3275 | 170 | 15.3 | 0.7 | 740 | 32 | 0.0028 |
| 012209-03 | e-80 | b-20 | MD | 566 | 44 | 3562 | 197 | 4653 | 222 | 14.5 | 1.6 | 694 | 54 | 0.0029 |
| | | | CD | 503 | 66 | 3278 | 62 | 3369 | 197 | 13.0 | 0.5 | 541 | 99 | 0.0029 |
| 012609-01 | e-80 | a-20 | MD | 360 | 19 | 2326 | 74 | 4561 | 392 | 19.9 | 0.8 | 838 | 65 | 0.0029 |
| | | | CD | 315 | 11 | 2301 | 51 | 3417 | 238 | 19.3 | 0.2 | 785 | 37 | 0.0029 |

Addition of co-PP makes film less stiff (lower Young's modulus) without affecting the other properties much.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

Although the present invention has been described with reference to preferred embodiments, workers skilled in the art will recognize that changes may be made in form and detail without departing from the spirit and scope of the invention.

What is claimed is:

1. A process for making a graphics film comprising the following steps in sequence:
  a. die coating and drying an ink receptive layer directly onto a polyester film;
  b. extrusion coating a polyolefin material onto the ink receptive layer at an extrusion temperature of from about 600° F. to 650° F.; and
  c. removing the polyester film from the ink receptive layer to expose a surface of the ink receptive layer;
  wherein the ink receptive layer is selected from a vinyl acetate homopolymer or copolymer or a mixture thereof, an acrylic copolymer or a mixture of an acrylic copolymer with a vinyl acetate/ethylene copolymer, a vinyl acetate/ethylene copolymer and an acrylic hybrid, or a polyurethane containing polymer; and
  wherein the graphics film is halogen-free.

2. The process of claim 1 wherein the polyester film is a polyethylene terephthalate (PET) film.

3. The process of claim 1 wherein the exposed surface of the ink receptive layer from step (c) is glossy.

4. The process of claim 3 wherein the gloss is greater than 70 gloss units.

5. The process of claim 1, where the polyolefin material is selected from one or more of polyethylene, polypropylene, ethylene vinyl acetate copolymer, ethylene copolymers with hexene, butene, or octene, polypropylene copolymers, poly-methyl-pentene, cyclic olefin polymer, cyclic olefin copolymers, metallocene catalyst based polyolefins, thermoplastics and elastomers or thereof.

6. The process of claim 1, wherein the ink receptive coating layer is coated to a thickness of less than 60 micron.

7. The process of claim 1, wherein the polyolefin layer is extrusion coated to a thickness of between 20 micron and 100 micron.

8. The process of claim 1 wherein the process further comprises treating the dried ink receptive layer of step (a) to impart improved adhesion properties to the ink receptive layer.

9. The process of claim 8 wherein the treating is selected from coating with an adhesion promoting layer, corona treatment, flame treatment, plasma treatment, ozone treatment or a combination thereof.

10. The process of claim 1 further comprising the step of:
  d. applying an adhesive layer onto the polyolefin material.

11. The process of claim 10, wherein the adhesive is a pressure sensitive adhesive.

12. The process of claim 10, wherein the polyolefin material is corona treated prior to application of the adhesive layer thereon.

13. The process of claim 10, wherein a liner is adhered to the adhesive layer.

14. The process of claim 1, wherein the ink receptive layer comprises a vinyl acetate homopolymer or copolymer or a mixture thereof; or a polyurethane-containing polymer.

15. The process of claim 1 wherein the polyolefin material comprises at least one material selected from the group consisting of:

an ethylene vinyl acetate (EVA) copolymer in which the vinyl acetate content ranges between 10-50%; and a vinyl acetate ethylene (VAE) copolymer in which the vinyl acetate content ranges between 60-90%.

16. The process of claim 1, wherein the ink receptive layer is selected from a vinyl acetate homopolymer or copolymer or a mixture thereof, an acrylic copolymer or a mixture of an acrylic copolymer with a vinyl acetate/ethylene copolymer, or a vinyl acetate/ethylene copolymer and an acrylic hybrid.

17. The process of claim 1, wherein the ink receptive layer comprises a vinyl acetate homopolymer or copolymer or a mixture thereof.

18. A process for making a graphics film comprising the following steps in sequence:
   a. coating and drying an ink receptive layer directly onto a polyester film;
   b. extrusion coating a molten polyolefin material onto the ink receptive layer; and
   c. removing the polyester film from the ink receptive layer to expose a surface of the ink receptive layer,
   wherein the ink receptive layer comprises at least one component selected from the group consisting of: a vinyl acetate homopolymer or copolymer or a mixture thereof, an acrylic copolymer or a mixture of an acrylic copolymer with a vinyl acetate/ethylene copolymer, a vinyl acetate/ethylene copolymer and an acrylic hybrid, and a polyurethane-containing polymer; and
   wherein the graphics film is halogen free.

19. A process for making a graphics film comprising the following steps in sequence:
   a. die coating and drying an ink receptive layer directly onto a polyester film;
   b. extrusion coating a polyolefin material onto the ink receptive layer; and
   c. removing the polyester film from the ink receptive layer to expose a surface of the ink receptive layer;
   wherein the ink receptive layer consists essentially of:
      a polymer selected from the group consisting of a vinyl acetate homopolymer, avinyl acetate copolymer, a mixture of a vinyl acetate homopolymer and a vinyl acetate copolymer, an acrylic copolymer, a mixture of an acrylic copolymer with a vinyl acetate/ethylene copolymer, a vinyl acetate/ethylene copolymer and an acrylic hybrid, and a polyurethane containing polymer; and
      optionally $TiO_2$; and
   wherein the graphics film is halogen-free.

20. The process of claim 19, wherein the polymer is selected from the group consisting of a vinyl acetate homopolymer, avinyl acetate copolymer, a mixture of a vinyl acetate homopolymer and a vinyl acetate copolymer, an acrylic copolymer, a mixture of an acrylic copolymer with a vinyl acetate/ethylene copolymer, and a vinyl acetate/ethylene copolymer and an acrylic hybrid.

* * * * *